Patented Dec. 24, 1929

1,740,840

UNITED STATES PATENT OFFICE

RUDOLF SCHNABEL, OF BERLIN, GERMANY, ASSIGNOR, BY MESNE ASSIGNMENTS, TO PYRENE-MINIMAX CORPORATION, A CORPORATION OF DELAWARE

PROCESS OF GENERATING FOAM, MIXTURES OF LIQUID AND GASEOUS SUBSTANCES, MIXTURES OF DIFFERENT LIQUIDS AND DIFFERENT GASES, OR EMULSIONS

No Drawing. Application filed April 23, 1927. Serial No. 186,167, and in Germany June 12, 1925.

The invention relates to an improved process of generating foam, mixtures of liquid and gaseous substances, mixtures of different liquids and different gases, or emulsions. The process described in the following is mainly intended to develop a new process for extinguishing fires by means of foam but, as mentioned above, is available also for other technical, cosmetic, medicinal, sanitary, et cetera, purposes.

The fundamental idea of my process consists in expanding a gas or air under pressure in the interior of a liquid capable to form foam, the stream of gas being subdivided and ramified in the best possible way, so that owing to the intimate mixture of the gas with the liquid abundant quantities of foam are formed. In the principle it is of no account by what constructive means said subdividing of the stream of gas or air is performed. According to one modification of carrying out the invention it is preferred, however, to do this in such a manner, that the gas or air under pressure is pressed through a porous body arranged in the interior of a liquid capable of forming foam. By this means the stream of gas or air is compelled to enter the liquid in the form of numerous minute pearls converting said liquid into a foam.

Said porous bodies f. i. may be filter-bodies made of ceramic material. In lieu of said porous bodies made of ceramic material another body, however, may be employed, having the quality to ramify the stream of gas or air.

Experiments have proved a hollow cylinder closed at the bottom and made of porous material suitable to bring about the effect described, the gas or air under pressure being forced through the walls of said cylinder. The quality of the foam produced moreover may be affected by employing bodies having either coarse or fine pores.

In carrying out the process in a period of time amounting to minutes only extraordinary large quantities of foam may be produced, said circumstance making the process especially fit for fire-extinguishing purposes.

According to another modification of carrying out the invention liquids and gases or air may be forced simultaneously through the mixing member, f. i. a porous body, whereby an extremely intimate mixture of the gases or air and the liquid employed takes place in the labyrinth-like intertwined and branching pores of the mixing member. In this process the liquid and the gas or air supplied are dissolved into a great number of individual part streams which during their traversal of the porous body repeatedly impinge against one another, intersect one another and cause eddies or whirls.

As suitable porous body the before mentioned filter bodies of ceramic material may again be used. It will, however, be understood, that instead of a solid porous body a layer of granulated material or a similar layer may be employed which, although it can hardly be described as porous in the exact meaning of the word, performs the same functions. It would, for instance, be possible to force gaseous and liquid substances together through a plurality of layers of a fine textile fabric or through a bundle of parallel thin wires or through a filter containing a plurality of layers of gravel of different sizes.

In practicing this modification of the process a hollow cylinder closed at the bottom may be used into the cavity of which the liquid together with the gas or air is introduced under pressure. In this way it is possible to produce a foam consisting of extremely fine bubbles and if mixtures of liquids are used emulsions may be produced.

The foam forming liquid in some cases may be formed in the interior of the porous member, f. i. by filling into the cavity of a porous hollow cylinder a foam generating substance in a solid condition and then pressing water and air or gas under pressure into said cavity.

According to the invention the present process may be utilized for the production of mixtures of liquid and gaseous substances and of mixtures of different liquids and different gases in pressing the substances to be mixed simultaneously under pressure through a mixing member of the kind of a porous body or of a layer interspersed with cavities and having the similar quality and effect as said porous body.

As pointed out in the preamble, the present process is by no means limited to the generation of foam for fire extinguishing purposes only, but it may equally well serve for generating foam or mixtures or emulsions for any other purpose.

Various changes and modifications may be made without departing from the spirit of the invention and the ambit of the claims and I desire therefore that only such limitations should be placed thereon as are imposed by the state of the prior art.

I claim as my invention:—

1. The process of producing foam, which consists in forcing a gas or air and a liquid capable of forming foam simultaneously through a porous member.

2. The process of producing foam, which consists in forcing a gas or air and a liquid capable of forming foam simultaneously through a plurality of layers of differently sized gravel.

In testimony whereof I affix my signature.

RUDOLF SCHNABEL.